(12) United States Patent  
Ishizuka et al.

(10) Patent No.: US 8,344,574 B2  
(45) Date of Patent: Jan. 1, 2013

(54) STATOR FOR ELECTRIC ROTATING MACHINE

(75) Inventors: Atsuo Ishizuka, Nagoya (JP); Akihito Koike, Kariya (JP)

(73) Assignee: Denso Corporation, Kariya (JP)

( * ) Notice: Subject to any disclaimer, the term of this patent is extended or adjusted under 35 U.S.C. 154(b) by 196 days.

(21) Appl. No.: 13/011,166

(22) Filed: Jan. 21, 2011

(65) Prior Publication Data

US 2011/0181144 A1      Jul. 28, 2011

(30) Foreign Application Priority Data

Jan. 22, 2010  (JP) ................................ 2010-012476

(51) Int. Cl.
*H02K 3/00* (2006.01)
(52) U.S. Cl. ........................................ 310/180; 310/184
(58) Field of Classification Search .................. 310/180, 310/184, 208
See application file for complete search history.

(56) References Cited

U.S. PATENT DOCUMENTS

| | | | |
|---|---|---|---|
| 5,994,813 A | 11/1999 | Umeda et al. | |
| 6,501,206 B2 * | 12/2002 | Oohashi et al. | 310/184 |
| 6,903,478 B2 * | 6/2005 | Dobashi et al. | 310/184 |
| 7,005,773 B2 * | 2/2006 | Nakamura | 310/180 |
| 2002/0033649 A1 | 3/2002 | Oohashi et al. | |
| 2004/0145257 A1 * | 7/2004 | Oohashi | 310/71 |

FOREIGN PATENT DOCUMENTS

| | | |
|---|---|---|
| JP | 11-341730 | 12/1999 |
| JP | 2002-95198 | 3/2002 |

* cited by examiner

*Primary Examiner* — Nguyen N Hanh
(74) *Attorney, Agent, or Firm* — Nixon & Vanderhye PC

(57) ABSTRACT

A stator for an electric rotating machine includes a stator coil that is formed of a plurality of electric wire segments each of which is comprised of an electric conductor and an insulating coat covering the electric conductor. The electric wire segments include a joined pair of first and second electric wire segments. Each of the first and second electric wire segments has an end portion of a first predetermined length where the electric conductor is not covered by the insulating coat. The end portions of the first and second electric wire segments are joined together. For each of the first and second electric wire segments, the insulating coat has, at its boundary with the end portion of the electric wire segment, a peeled portion of a second predetermined length which has a distal end peeled from the electric conductor and a proximal end remaining attached to the electric conductor.

8 Claims, 9 Drawing Sheets

STATOR FOR ELECTRIC ROTATING MACHINE

CROSS-REFERENCE TO RELATED APPLICATION

This application is based on and claims priority from Japanese Patent Application No. 2010-42476, filed on Jan. 22, 2010, the content of which is hereby incorporated by reference in its entirety into this application.

BACKGROUND OF THE INVENTION

1. Technical Field of the Invention

The present invention relates to stators for electric rotating machines that are used in, for example, motor vehicles as electric motors and electric generators.

2. Description of the Related Art

Japanese Patent Application Publication No. H11-341730 discloses an automotive alternator which includes a rotor and a stator. The stator includes a hollow cylindrical stator core, which is disposed to surround the rotor, and a stator coil mounted on the stator core. The stator coil is formed of a plurality of electric conductor segments. Each of the electric conductor segments includes inside portions that are received in corresponding slots of the stator core and outside portions that protrude outside the corresponding slots. Moreover, each corresponding pair of the electric conductor segments are joined together by welding corresponding ends of the outside portions of the electric conductor segments on one axial side of the stator core, forming a joint (or weld) therebetween. The joints formed between the electric conductor segments are spaced from one another so as to together form an annular shape. Furthermore, insulators, which are made of an electrically insulative resin, are formed to each cover one of the joints formed between the electric conductor segments, thereby electrically insulating the joints from one another and from other components of the alternator located close to the joints.

With the above configuration, to more reliably ensure the electric insulation between the joints, it is necessary to perform a fail-safe design so that even if the insulators become peeled from the joints, it is still possible to prevent a short circuit from occurring between the joints.

More specifically, when the insulators are peeled from the joints, an electrically conductive path may be formed between an adjacent pair of the joints along the surfaces of insulating coats that cover the electric conductor segments, thereby causing a short circuit to occur therebetween. Therefore, to more reliably ensure the electric insulation between the joints, it is necessary to secure a sufficiently long creepage distance for each adjacent pair of the joints with respect to the voltage to be applied to the stator coil. Here, for each adjacent pair of the joints, the creepage distance denotes the shortest distance between the pair of the joints along the surfaces of the insulating coats covering the electric conductor segments.

SUMMARY OF THE INVENTION

According to an embodiment of the invention, there is provided a stator for an electric rotating machine. The stator includes a stator core and a stator coil mounted on the stator core. The stator coil is formed of a plurality of electric wire segments each of which is comprised of an electric conductor and an insulating coat that covers the outer surface of the electric conductor. The electric wire segments forming the stator coil include a joined pair of first and second electric wire segments. Each of the first and second electric wire segments has an end portion of a first predetermined length where the electric conductor is not covered by the insulating coat. The end portions of the first and second electric wire segments are joined together. For each of the first and second electric wire segments, the insulating coat has, at its boundary with the end portion of the electric wire segment, a peeled portion of a second predetermined length which has a distal end peeled from the electric conductor and a proximal end remaining attached to the electric conductor. The proximal end is positioned further from the end portion of the electric wire segment than the distal end is.

According to another embodiment of the invention, there is provided a stator for an electric rotating machine. The stator includes a stator core and a stator coil mounted on the stator core. The stator coil is formed of a plurality of electric wire segments each of which is comprised of an electric conductor and an insulating coat that includes an inner layer and an outer layer. The inner layer covers the outer surface of the electric conductor, and the outer layer covers the outer surface of the inner layer. The electric wire segments forming the stator coil include a joined pair of first and second electric wire segments. Each of the first and second electric wire segments has an end portion of a first predetermined length where the electric conductor is not covered by the insulating coat. The end portions of the first and second electric wire segments are joined together. For each of the first and second electric wire segments, the inner layer of the insulating coat abuts the electric conductor and has an end at its boundary with the end portion of the electric wire segment; the outer layer of the insulating coat has a peeled portion of a second predetermined length which has a distal end peeled from the end of the inner layer and a proximal end remaining attached to the inner layer.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Figure 1:
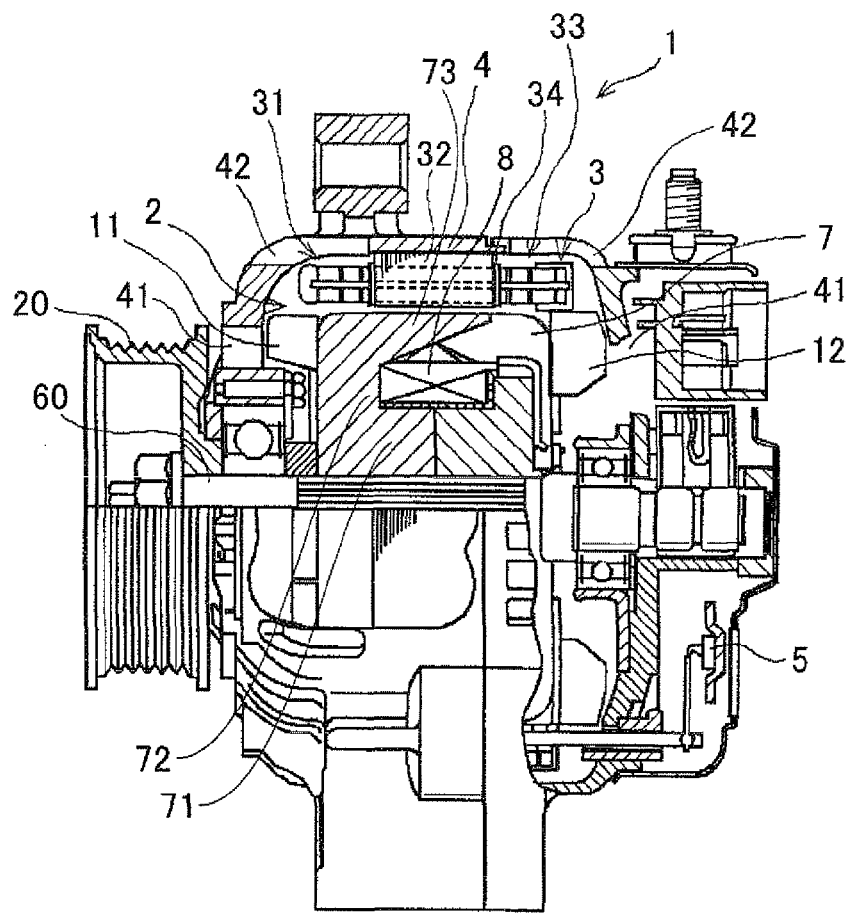
FIG. 1 is a partially cross-sectional view showing the overall configuration of an automotive alternator which includes a stator according to the first embodiment of the invention.

Preferred embodiments of the present invention will be described hereinafter with reference to FIGS. 1-15. It should be noted that for the sake of clarity and understanding, identical components having identical functions in different embodiments of the invention have been marked, where possible, with the same reference numerals in each of the figures and that for the sake of avoiding redundancy, descriptions of the identical components will not be repeated.

First Embodiment

FIG. 1 shows the overall configuration of an automotive alternator 1 which includes a stator 3 according to the first embodiment of the invention. The alternator 1 is designed to be used in a motor vehicle, such as a passenger car or a truck.

As shown in FIG. 1, the alternator 1 further includes a rotor 2, a frame 4, and a rectifier 5 in addition to the stator 3.

The rotor 2 includes a shaft 6, a pair of Lundell-type magnetic pole cores 7, a field coil 8, a mixed-flow fan 11, and a centrifugal fan 12.

The shaft 6 has a pulley 20 mounted on an end portion thereof (i.e., a left end portion in FIG. 1), so that it can be driven by an internal combustion engine of the vehicle via the pulley 20.

Each of the magnetic pole cores 7 has a hollow cylindrical boss portion 71, a disc portion 72, and a plurality of (e.g., 6 in the present embodiment) magnetic pole claws 73. The boss portion 71 is fitted on the shaft 6 so as to rotate along with the rotary shaft 6. The disc portion 72 extends radially outward from an axially outer part of the boss portion 71. Each of the magnetic pole claws 73 axially extends from a radially outer part of the disc portion 72.

The magnetic pole cores 7 are assembled together so that the magnetic pole claws 73 of one of the magnetic pole cores 7 are interleaved with the magnetic pole claws 73 of the other magnetic pole core 7.

The field coil 8 is formed by winding an insulation-treated copper wire into a hollow cylindrical shape. The field coil 8 is mounted on both the boss portions 71 of the magnetic pole cores 7 so as to be axially interposed between the disc portions 72 of the magnetic pole cores 7. In addition, the field coil 8 also abuts, under a suitable pressure, a radially inner part of each of the magnetic pole claws 73 of the magnetic pole cores 7.

The mixed-flow fan 11 is fixed, for example by welding, to an axial end face of the disc portion 72 of that one of the magnetic pole cores 7 which is located on the pulley 20 side (i.e., the left side in FIG. 1). The mixed-flow fan 11 sucks cooling air from the pulley 20 side and discharges the same both in the axial and radial directions of the shaft 6. On the other hand, the centrifugal fan 12 is fixed, for example by welding, to an axial end face of the disc portion 72 of the other magnetic pole core 7 which is located on the opposite side to the pulley 20 (i.e., the right side in FIG. 1). The centrifugal fan 12 sucks cooling air from the opposite side to the pulley 20 and discharges the same in the radial direction of the shaft 6.

The stator 3 includes a hollow cylindrical stator core 32, a three-phase stator coil that is comprised of a plurality of electric wire segments 33, and an insulator 34. The stator core 32 is formed by laminating a plurality of thin steel sheets. The stator core 32 has a plurality of slots 35 that are formed in the radially inner surface of the stator core 32 and spaced in the circumferential direction of the stator core 32 at a predetermined pitch. The electric wire segments 33 forming the stator coil are partially received in the slots 35 of the stator core 32. Those portions of the electric wire segments 33 which are located outside the slots 35 make up coil ends 31 of the stator 3. The insulator 34 is interposed between the stator core 32 and the electric wire segments 33 to electrically isolate the stator core 32 from the electric wire segments 33.

The frame 4 receives both the rotor 2 and the stator 3 so that the rotor 2 is rotatably supported by the frame 4 and the stator 3 is fixed on the radially outer side of the rotor 2 with a predetermined radial gap between the rotor 2 and the stator 3. In other words, the stator 3 is disposed radially outside the rotor 2 to surround the rotor 2 with the predetermined radial gap therebetween. Moreover, the frame 4 has a plurality of cooling air suction openings 41 and a plurality of cooling air discharge openings 42. The cooling air suction openings 41 are formed through axial end walls of the frame 4. The cooling air discharge openings 42 are formed through the frame 4 so as to face the coil ends 31 of the stator 3.

The rectifier 5 is fixed to the outer surface of that axial end wall of the frame 4 which is located on the opposite side to the pulley 20. The rectifier 5 is configured to full-wave rectify three-phase AC power output from the stator coil into DC power.

The automotive alternator 1 having the above-described configuration operates as follows. When torque is transmitted from the engine to the pulley 20 via a belt (not shown), the rotor 2 is driven by the torque to rotate in a given direction. During the rotation of the rotor 2, field current is supplied to the field coil 8, thereby magnetizing the magnetic pole claws 73 of the magnetic pole cores 7 to create a rotating magnetic field. The rotating magnetic field induces the three-phase AC power in the stator coil. The rectifier 5 full-wave rectifies the three-phase AC power output from the stator coil into the DC power. The resultant DC power is then output from the alternator 1 via an output terminal of the rectifier 5.

Next, the configuration of the electric wire segments 33 according to the present embodiment will be described.

Figures 2A, 2B:
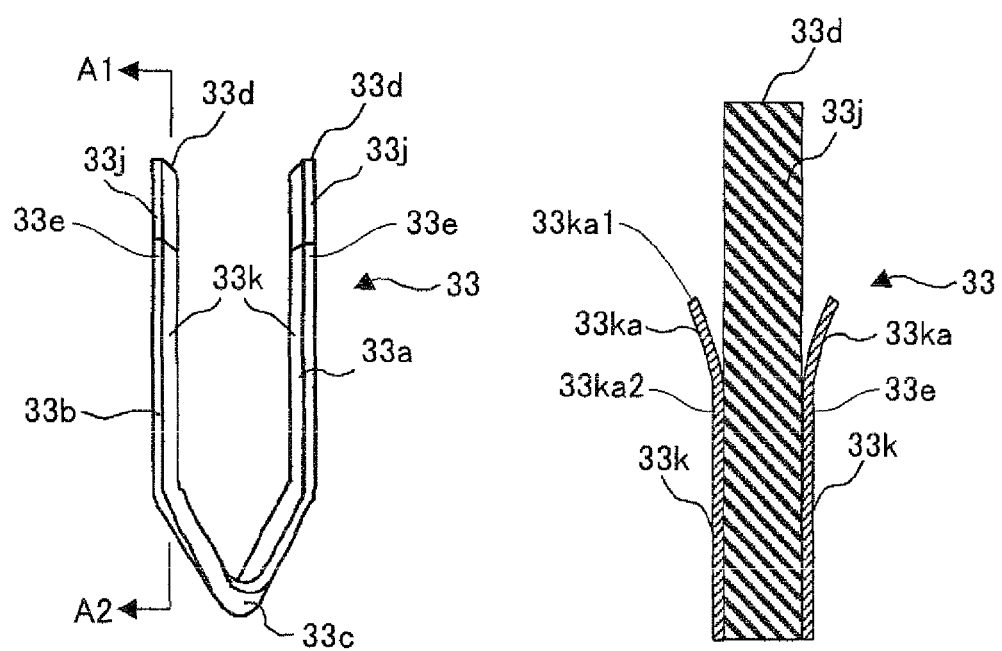
FIG. 2A is a perspective view showing one of electric wire segments, which together make up a stator coil of the stator, before the electric wire segments are mounted to a stator core of the stator.
FIG. 2B is a cross-sectional view taken along the line A1-A2 in FIG. 2A.

FIGS. 2A-2B show the configuration of the electric wire segments 33 before they are mounted to the stator core 32. As shown, each of the electric wire segments 33 is configured with an electric conductor 33*j* and an insulating coat 33K that covers the outer surface of the electric conductor 33*j*.

Figure 3:
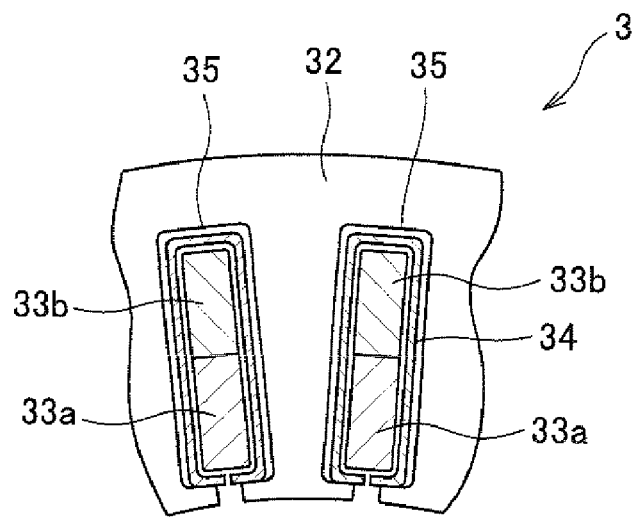
FIG. 3 is a partially cross-sectional view showing part of the stator.
Figure 4:
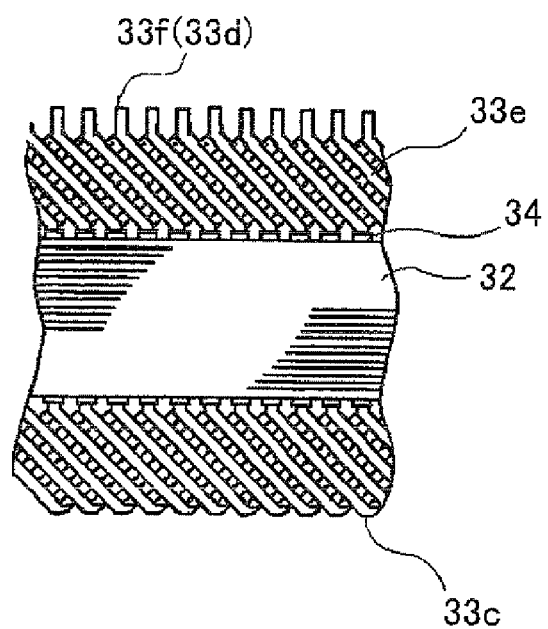
FIG. 4 is a schematic view showing part of the stator.

The electric conductor 33*j* has a substantially rectangular cross section and is made by shaping, for example, a copper plate. More specifically, the electric conductor 33*j* is bent into a substantially U-shape to include first and second portions 33*a* and 33*b* that extend straight and a turn portion 33*c* that connects the first and second portions 33*a* and 33*b*. Referring to FIG. 3, the first portion 33*a* is to be located at a radially inner layer in a corresponding one of the slots 35 of the stator core 32, while the second portion 33*b* is to be located at a radially outer layer in another corresponding one of the slots 35. Referring further to FIG. 4, the turn portion 33*c* is to be located on one axial side of the stator core 32 outside the slots 35. Each of the first and second portions 33*a* and 33*b* is to be only partially received in the corresponding slot 35, so as to have an outside part 33*e* that protrudes from the corresponding slot 35 on the other axial side of the stator core 32.

The insulating coat 33*k* is made of enamel or a resin such as PPS (polyphenylene sulfide). In the present embodiment, as shown in FIG. 2B, each of the outside parts 33*e* of the first and second portions 33*a* and 33*b* includes a stripped portion 33*d* that is formed by stripping the insulating coat 33*k* off the electric conductor 33*j* for a first predetermined length from the distal end of the outside part 33*e*. Further, the insulating coat 33K includes, at its boundary with the stripped portion 33*d*, a peeled portion 33*ka* of a second predetermined length which has a distal end 33*ka*1 peeled from the electric conductor 33*j* and a proximal end 33*ka*2 remaining attached to the electric conductor 33*j*. The peeled portion 33*ka* extends obliquely with respect to the electric conductor 33*j* so as to expand from the proximal end 33*ka*2 to the distal end 33*ka*1. In other words, the peeled portion 33*ka* is formed to have the shape of a truncated cone tapering from the distal end 33*ka*1 to the proximal end 33*ka*2.

The stator coil is formed using the above-described electric wire segments 33 in the following way.

At the first step, each of the electric wire segments 33 is mounted to the stator core 32 by inserting, from one axial side of the stator core 32, the first and second portions 33*a* and 33*b* of the electric wire segment 33 respectively into two corresponding slots 35 of the stator core 32. Consequently, as shown in FIG. 3, the first portion 33*a* is located at the radially inner layer in one corresponding slot 35, while the second portion 33*b* is located at the radially outer layer in the other corresponding slot 35. Moreover, as shown in FIG. 4, all of the turn portions 33*c* of the electric wire segments 33 are aligned with each other on the one axial side of the stator core 32; all the outside parts 33*e* of the first and second portions 33*a* and 33*b* of the electric wire segments 33 protrude from the corresponding slots 35 on the other axial side of the stator core 32.

In addition, as shown in FIG. 3, each of the first and second portions 33*a* and 33*b* of the electric wire segments 33 has the shorter side of its cross section arranged perpendicular to a radial direction of the stator core 32 and the longer side of the same arranged parallel to the radial direction. Each of the first and second portions 33*a* and 33*b* of the electric wire segments 33 is press-fitted into the corresponding slot 35 of the stator core 32, so as to abut the interior wall of the stator core 32 defining the corresponding slot 35 via the insulator 34.

Figure 6:
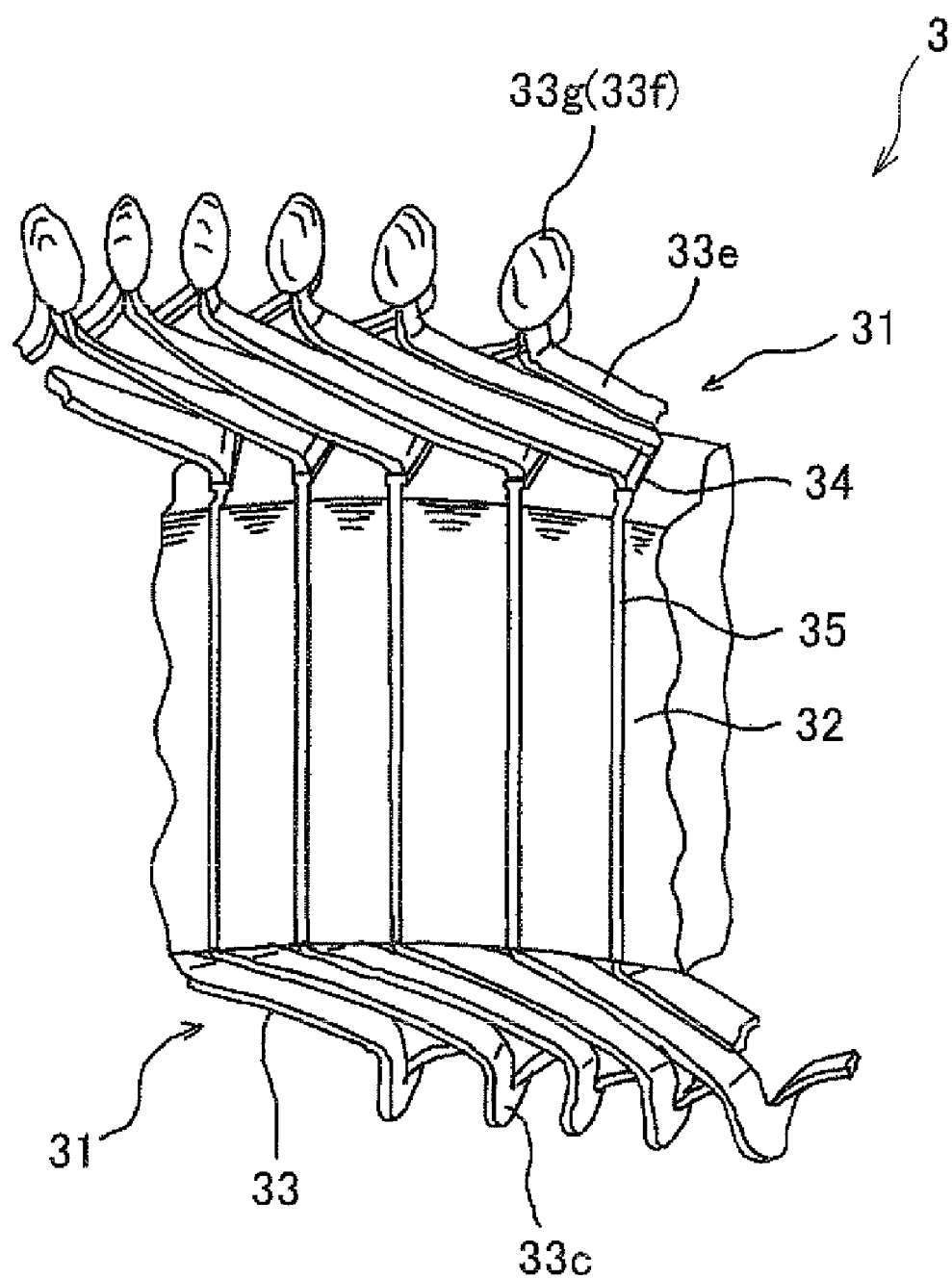
FIG. 6 is a perspective view showing coil ends of the stator.

At the second step, referring to FIGS. 4 and 6, all the outside parts 33*e* of the first portions 33*a* of the electric wire segments 33 are bent clockwise by a predetermined angle, so as to extend obliquely with respect to the axial direction of the stator core 32. On the other hand, all the outside parts 33*e* of the second portions 33*b* of the electric wire segments 33 are bent counterclockwise by the predetermined angle, so as to extend obliquely with respect to the axial direction.

In addition, as shown in FIG. 6, all the turn portions 33*c* of the electric wire segments 33 together make up the coil end 31 on one axial side of the stator core 32, whereas all the outside parts 33*e* of the first and second portions 33*a* and 33*b* of the electric wire segments 33 together make up the coil end 31 on the other axial side of the stator core 32.

At the third step, each corresponding pair of the stripped portions 33*d* of the electric wire segments 33 are joined together by TIG (Tungsten Inert Gas) welding, forming a joint (or weld) 33*f* therebetween.

TIG welding is an arc welding process that produces an arc in an inert gas atmosphere between a tungsten electrode and a base metal and melts both the base metal and a filler metal using the heat generated by the arc to form a weld. One advantage of TIG welding is that it is possible to separately control the amount of the heat generated by the arc and the amount of the filler metal added to the base metal.

In the present embodiment, by joining each corresponding pair of the stripped portions 33*d* of the electric wire segments 33 using TIG welding, it becomes possible to melt only a small area around the stripped portions 33*d* to form the joint 33*f* therebetween.

Figure 5A:
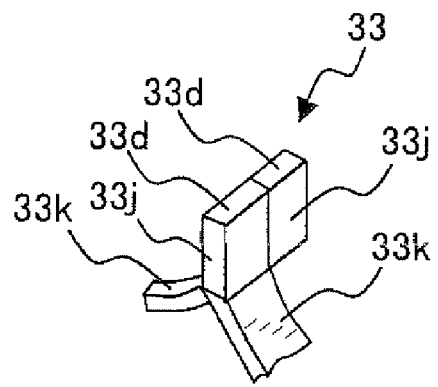
FIG. 5A is a perspective view showing a pair of stripped portions of the electric wire segments which are brought into contact with each other before welding.
Figure 5B:
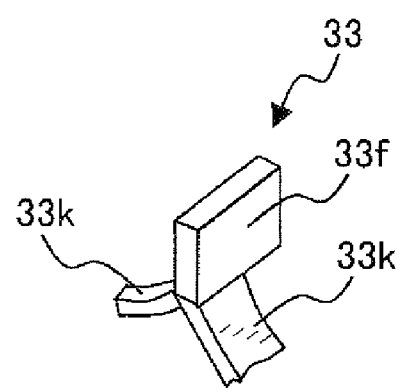
FIG. 5B is a perspective view showing a joint formed between the stripped portions by welding.
Figure 5C:
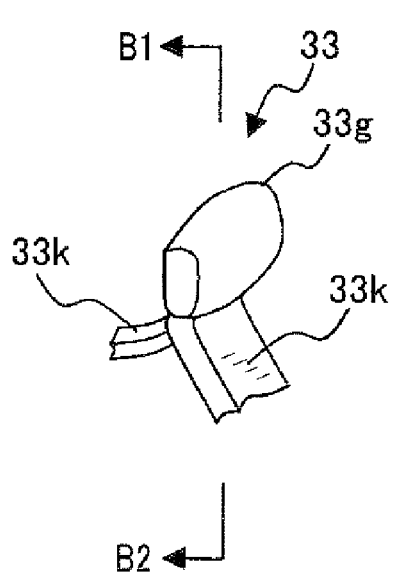
FIG. 5C is a perspective view showing an insulator that is formed to cover the joint.

Specifically, at this step, the stripped portions 33*d* of the electric wire segments 33 are first brought into contact with each other as shown in FIG. 5A. Then, the stripped portions 33*d* are joined together by TIG welding, forming the joint 33*f* as shown in FIG. 5B. Thereafter, the joint 33*f* is pre-heated and dipped into a bath (not shown) in which a powder resin is stirred by feeding air thereinto. Consequently, the power resin which has adhered to the joint 33*f* is melted by the heat transmitted from the pre-heated joint 33*f*, forming an insulator 33*g* on the surface of the joint 33*f* as shown in FIG. 5C.

Figure 5D:
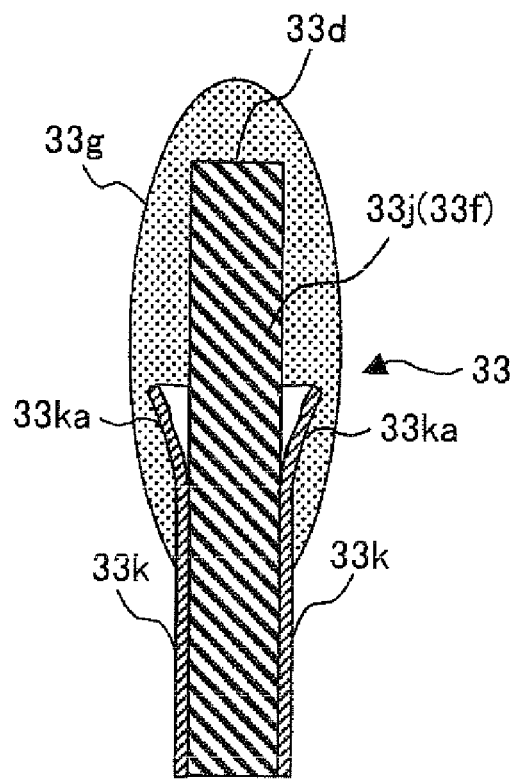
FIG. 5D is a cross-sectional view taken along the line B1-B2 in FIG. 5C.

Moreover, as shown in FIG. 5D, the insulator 33*g* is formed to completely cover the peeled portions 33*ka* of the insulating coats 33*k* of the electric wire segments 33 as well as the stripped portions 33*d* of the electric wire segments 33. Consequently, the peeled portions 33*ka* of the insulating coats 33*k*, which have the shape of a truncated cone, each make up a wedge embedded in the insulator 33*g* to prevent the insulator 33*g* from peeling off the joint 33*f*.

In addition, as shown in FIG. 6, all of the joints 33*f* formed between the electric wire segments 33, which have the respective insulators 33*g* formed thereon, have the same protruding height from the axial end face of the stator core 32.

As described above, the stator 3 according to the present embodiment includes the stator core 32 and the stator coil mounted on the stator core 32. The stator coil is formed of the electric wire segments 33 each of which is comprised of the electric conductor 33*j* and the insulating coat 33*k* that covers the outer surface of the electric conductor 33*j*. Each of the electric wire segments 33 includes the outside parts 33*e* located outside the slots 35 of the stator core 32. Each of the outside parts 33*e* includes, as shown in FIG. 2B, the stripped portion 33*d* that is formed by stripping the insulating coat 33*k* off the electric conductor 33*j* for the first predetermined length from the distal end of the outside part 33*e*. Further, the insulating coat 33K includes, at its boundary with the stripped portion 33d, the peeled portion 33ka of the second predetermined length which has the distal end 33ka1 peeled from the electric conductor 33j and the proximal end 33ka2 remaining attached to the electric conductor 33j. Furthermore, each corresponding pair of the stripped portions 33d of the electric wire segments 33 are joined together by TIG welding, forming the joint 33f therebetween.

With the above configuration, it is possible to achieve the flowing advantages effects.

Figure 7:
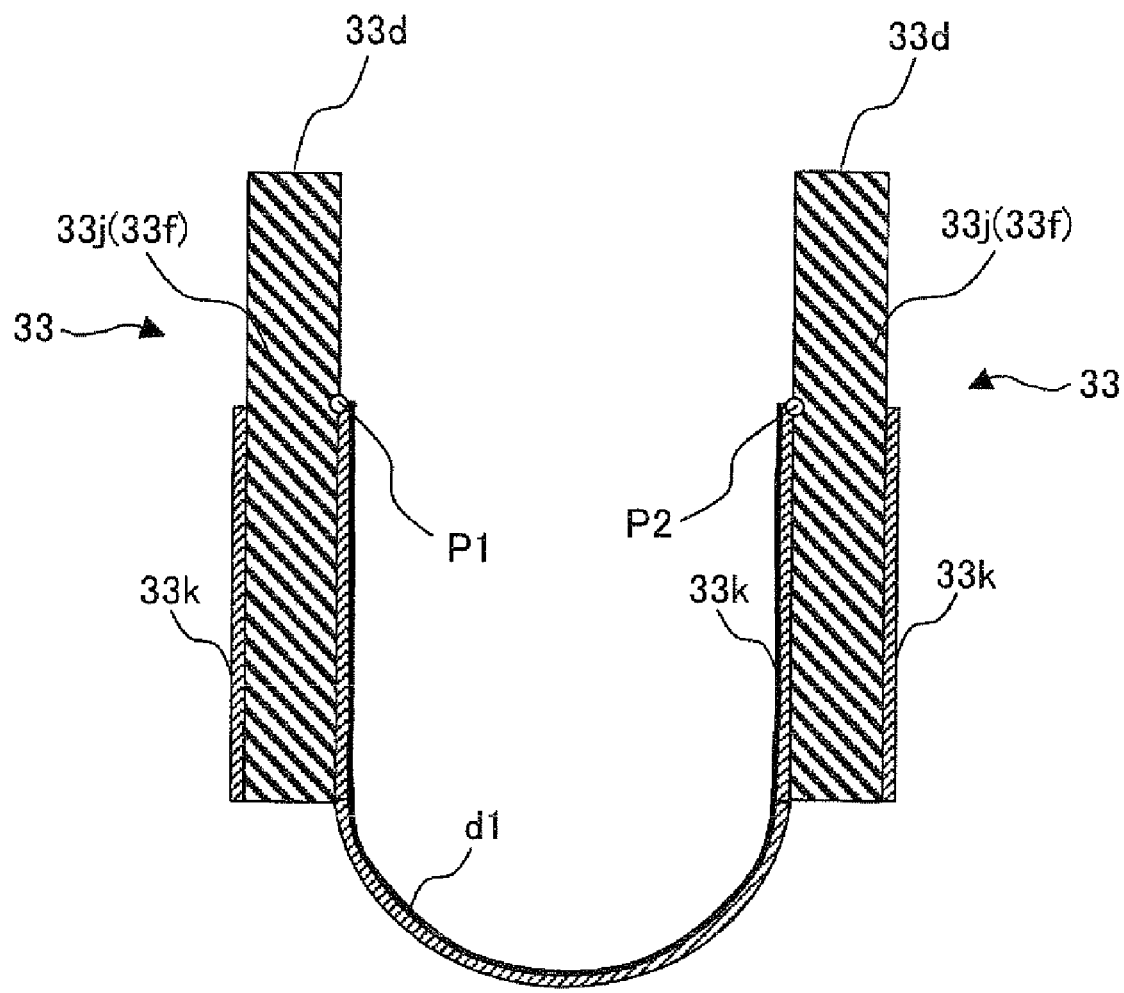
FIG. 7 is a schematic view illustrating the creepage distance between each adjacent pair of joints formed between electric wire segments according to a related art.

FIG. 7 illustrates a related art according to which each of the insulating coats 33k of the electric wire segments 33 includes no peeled portion 33ka. Consequently, the creepage distance between each adjacent pair of the joints 33f formed between the electric wire segments 33 can be represented by the length of a heavy line d1 extending between points P1 and P2 in FIG. 7; the points P1 and P2 respectively represent the positions of two adjacent boundaries between the insulating coats 33k and the stripped portions 33d of the electric wire segments 33.

Figure 8:
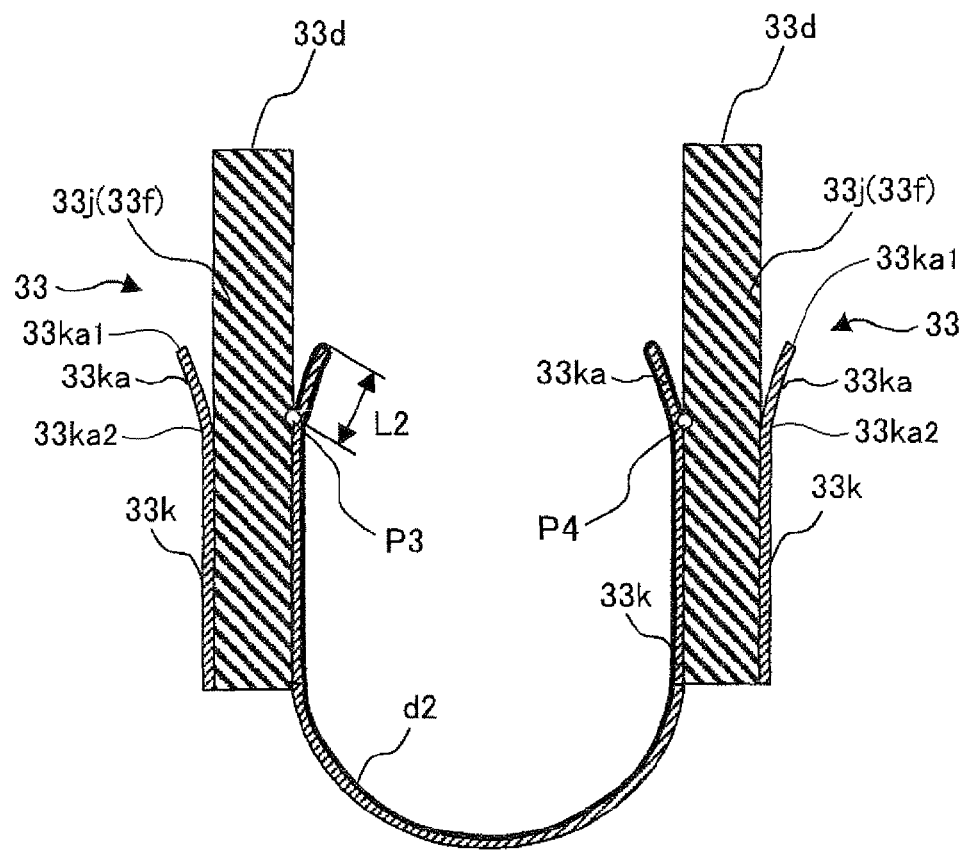
FIG. 8 is a schematic view illustrating the creepage distance between each adjacent pair of the joints formed between the electric wire segments according to the first embodiment.

In comparison, according to the present embodiment, as shown in FIG. 8, each of the insulating coats 33k of the electric wire segments 33 includes the peeled portions 33ka having the second predetermined length L2. Consequently, the creepage distance between each adjacent pair of the joints 33f formed between the electric wire segments 33 can be represented by the length of a heavy line d2 extending between points P3 and P4 in FIG. 8; the points P3 and P4 respectively represent the positions of two adjacent boundaries between the proximal ends 33ka2 of the insulating coats 33k and the stripped portions 33d of the electric wire segments 33.

It can be seen from FIGS. 7 and 8 that the creepage distance between each adjacent pair of the joints 33f formed between the electric wire segments 33 according to the present embodiment is longer than that according the related art by 2×L2.

Figure 9:
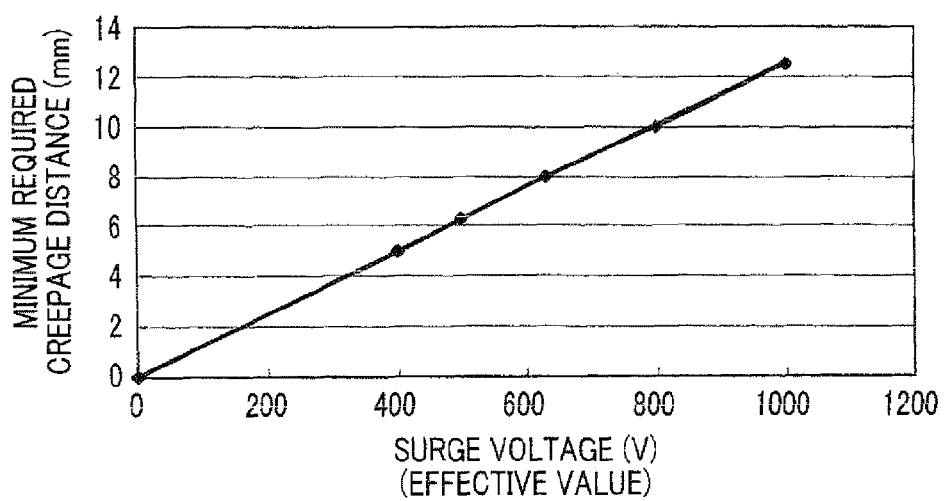
FIG. 9 is a graph illustrating the relationship between the surge voltage produced in a coil and the minimum required creepage distance for protecting the coil from the surge voltage.

FIG. 9 shows the relationship, specified in JIS (Japanese Industrial Standards) C 0664, between the surge voltage produced in a coil and the minimum required creepage distance for protecting the coil from the surge voltage.

As can be seen from FIG. 9, supposing the maximum surge voltage of about 1000 V to be applied between the joints 33f in the stator coil, the minimum required creepage distance between the joints 33f is then in the range of 12 to 13 mm. Further, supposing the second predetermined distance L2 to be 4 mm, then it is possible to increase the creepage distance between the joints 33f by 8 mm according to the present embodiment. That is, according to the present embodiment, it is possible to achieve an increase in the creepage distance which corresponds to 61-67% of the minimum required creepage distance between the joints 33f.

Therefore, according to the present embodiment, it is possible to ensure a high insulation reliability of the stator 3.

Moreover, in the present embodiment, as shown in FIG. 5D, for each joined pair of the stripped portions 33d of the electric wire segments 33, there is provided the insulator 33g that covers the peeled portions 33ka of the insulating coats 33k as well as the stripped portions 33d of the electric wire segments 33.

Consequently, with the insulator 33g, it is possible to electrically insulate the stripped portions 33d along with the joint 33f formed therebetween.

Furthermore, in the present embodiment, each of the peeled portions 33ka of the insulating coats 33k of the electric wire segments 33 extends obliquely with respect to the electric conductor 33j so as to expand from the proximal end 33ka2 to the distal end 33ka1.

With the above configuration, each of the peeled portions 33ka makes up a wedge embedded in the insulator 33g to prevent the insulator 33g from peeling off the electric wire segments 33.

Modification

Figure 10:
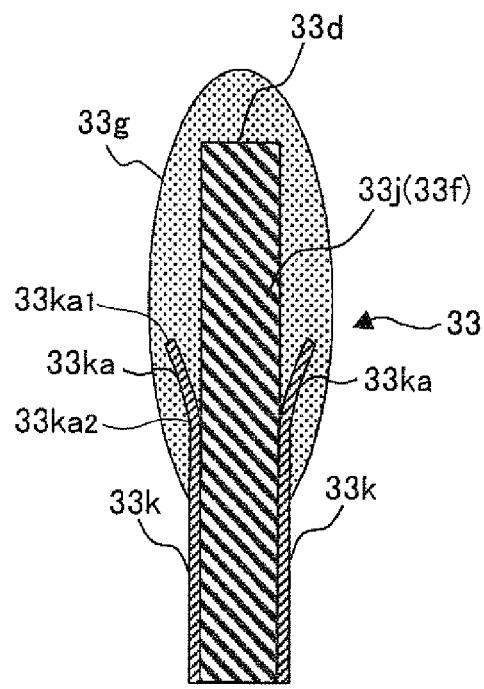
FIG. 10 is a cross-sectional view illustrating the formation of the insulator according to a modification of the first embodiment.

In this modification, as shown in FIG. 10, for each joined pair of the stripped portions 33d of the electric wire segments 33, the insulator 33g is so formed as to fill the spaces between the peeled portions 33ka of the insulating coats 33k and the electric conductors 33j of the electric wire segments 33.

With the above formation, it is possible to increase the contact area between the insulator 33g and the electric wire segments 33, thereby more reliably preventing the insulator 33g from peeling off the electric wire segments 33.

Second Embodiment

In this embodiment, for each of the electric wire segments 33, the insulating coat is provided in two layers. Specifically, as shown in FIG. 11A, the insulating coat includes an inner layer 33m that covers the outer surface of the electric conductor 33j and an outer layer 33k that covers the outer surface of the inner layer 33m.

The inner layer 33m is made of, for example, enamel. The inner layer 33m abuts the electric conductor 33j and has an end 33m1 at its boundary with the stripped portion 33d of the electric conductor 33j. In other words, the inner layer 33m has no portion peeling from the electric conductor 33j.

The outer layer 33k is made of, for example, PPS. The outer layer 33k includes a peeled portion 33ka of the second predetermined length L2 which has a distal end 33ka1 peeled from the end 33m1 of the inner layer 33m and a proximal end 33ka2 remaining attached to the inner layer 33m. The peeled portion 33ka extends obliquely with respect to the inner layer 33m so as to expand from the proximal end 33ka2 to the distal end 33ka1. In other words, the peeled portion 33ka is formed to have the shape of a truncated cone tapering from the distal end 33ka1 to the proximal end 33ka2.

Figures 11A, 11B:
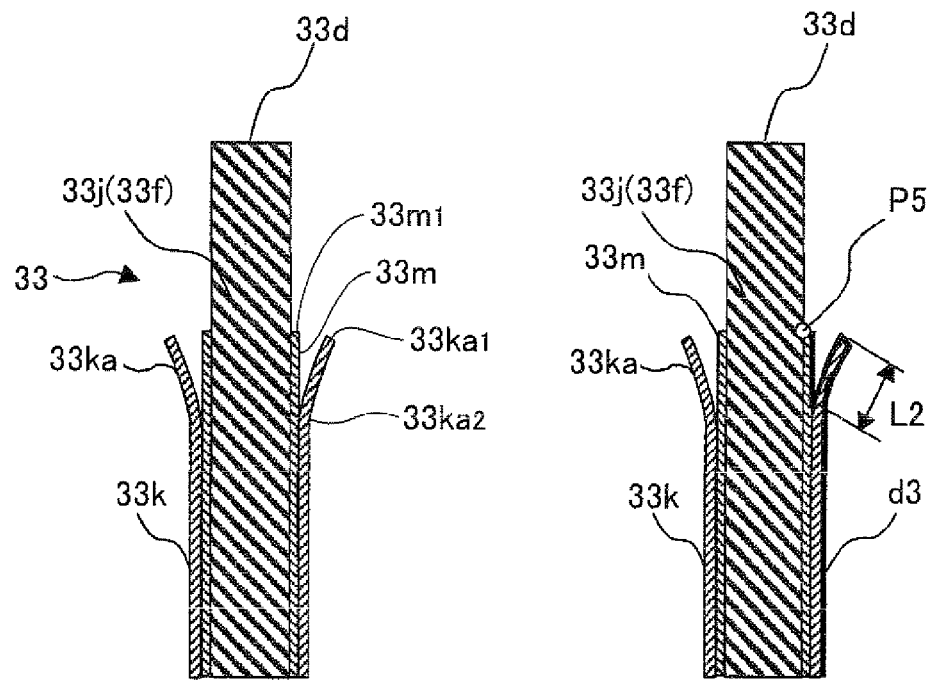
FIG. 11A is a cross-sectional view illustrating the configuration of electric wire segments according to the second embodiment of the invention.
FIG. 11B is a schematic view illustrating the creepage distance between each adjacent pair of the joints formed between the electric wire segments according to the second embodiment.

With the above configuration, referring to FIG. 11B, the creepage distance between each adjacent pair of the joints 33f formed between the electric wire segments 33 can be represented by the length of a heavy line d3 which is only partially shown in FIG. 11B. The heavy line d3 extends from the boundary P5 between the inner layer 33m and the stripped portion 33d of the electric conductor 33j in one electric wire segment 33 to the boundary (not shown) between the inner layer 33m and the stripped portion 33d of the electric conductor 33j in the other electric wire segment 33.

It can be seen from FIGS. 7 and 11B that the creepage distance between each adjacent pair of the joints 33f formed between the electric wire segments 33 according to the present embodiment is longer than that according the related art by 4×L2.

Therefore, according to the present embodiment, it is possible to further improve the insulation reliability of the stator 3.

Figure 12:
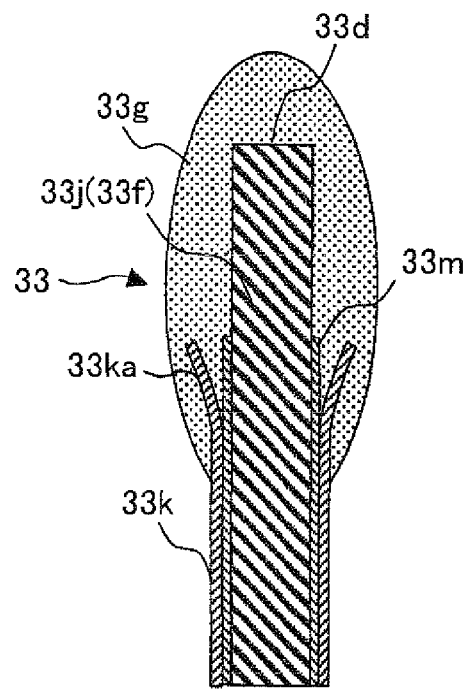
FIG. 12 is a cross-sectional view showing the formation of an insulator according the second embodiment.

Moreover, in the present embodiment, as shown in FIG. 12, for each joined pair of the stripped portions 33d of the electric wire segments 33, there is provided an insulator 33g that covers the peeled portions 33ka of the outer layers 33k of the insulating coats as well as the stripped portions 33d of the electric wire segments 33.

Consequently, with the insulator 33g, it is possible to electrically insulate the stripped portions 33d along with the joint 33f formed therebetween.

Further, in the present embodiment, each of the peeled portions 33ka of the outer layers 33k of the insulating coats of the electric wire segments 33 extends obliquely with respect to the inner layer 33m so as to expand from the proximal end 33ka2 to the distal end 33ka1 thereof.

With the above configuration, each of the peeled portions 33ka makes up a wedge embedded in the insulator 33g to prevent the insulator 33g from peeling off the electric wire segments 33.

Furthermore, in the present embodiment, for each joined pair of the stripped portions 33d of the electric wire segments 33, the insulator 33g is so formed as to fill the spaces between the peeled portions 33ka of the outer layers 33k and the inner layers 33m of the insulating coats of the electric wire segments 33.

With the above formation, it is possible to increase the contact area between the insulator 33g and the electric wire segments 33, thereby more reliably preventing the insulator 33g from peeling off the electric wire segments 33.

Modification

Figure 13:
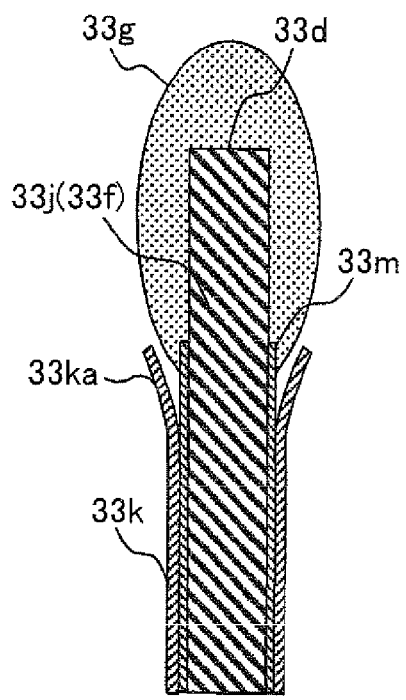
FIG. 13 is a cross-sectional view showing the formation of an insulator according to a modification of the second embodiment.

In this modification, as shown in FIG. 13, for each joined pair of the stripped portions 33d of the electric wire segments 33, the insulator 33g is so formed as to cover only the stripped portions 33d and the boundaries thereof with the inner layers 33m of the insulating coats of the electric wire segments 33. Consequently, the spaces between the peeled portions 33ka of the outer layers 33k and the inner layers 33m of the insulating coats of the electric wire segments 33 are not filled with the insulator 33g.

Third Embodiment

Figure 14:
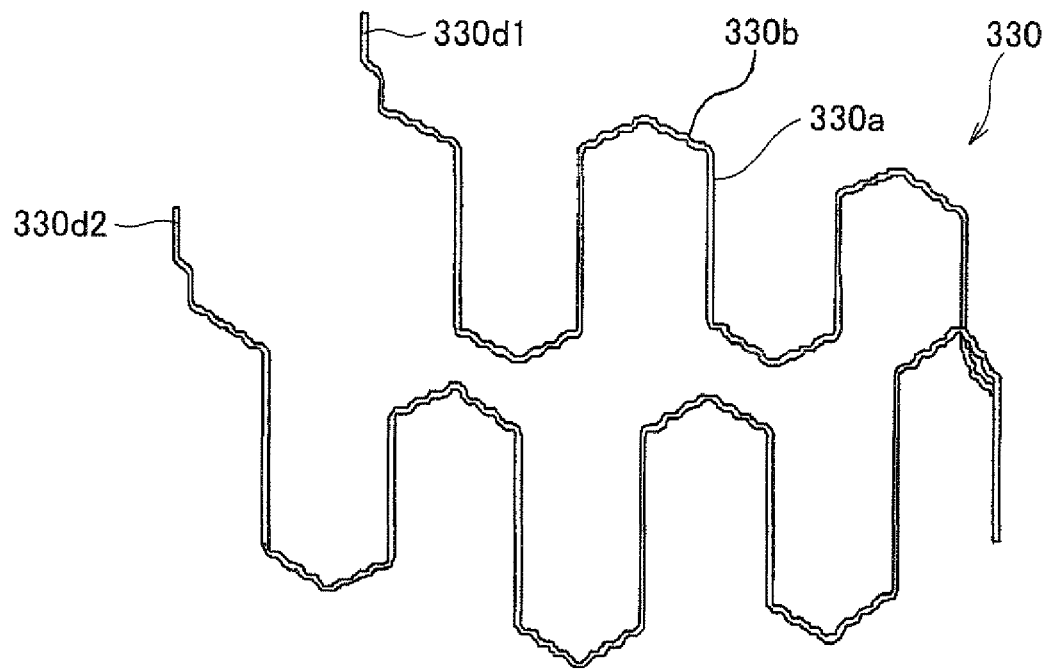
FIG. 14 is a perspective view illustrating the configuration of electric wire segments according to the third embodiment of the invention.

FIG. 14 shows the configuration of electric wire segments 330 according to the third embodiment of the invention.

As shown in FIG. 14, in the present embodiment, each of the electric wire segments 330 includes a plurality of straight portions 330a, each of which is to be received in a corresponding one of the slots 35 of the stator core 32, and a plurality of turn portions 330b each of which connects an adjacent pair of the straight portions 330a and is to be located outside the slots 35 of the stator core 32. Further, each of the electric wire segments 330 also includes a pair of stripped portions 330d1 and 330d2 that are respectively formed at opposite ends of the electric wire segment 330 in the same manner as the stripped portions 33d of the electric wire segments 33 according to the first embodiment. The stripped portions 330d1 is to be led out from the radially inner periphery of one slot 35 of the stator core 32, while the stripped portion 330d2 is to be led out from the radially outer periphery of another slot 35 of the stator core 32.

Figure 15:
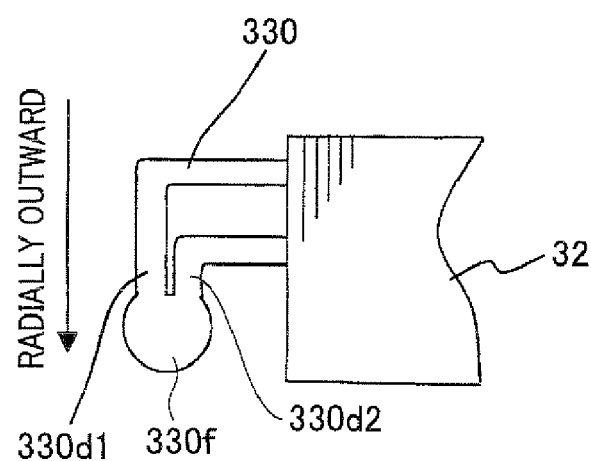
FIG. 15 is a schematic view showing a joint formed between a corresponding pair of stripped portions of the electric wire segments according to the third embodiment.

Moreover, referring to FIG. 15, after mounting the electric wire segments 330 to the stator core 30, each corresponding pair of the stripped portions 330d1 and 330d2 of the electric wire segments 330 are jointed, radially outside the slots 35 of the stator core 32, to form a joint 330f therebetween.

With the electric wire segments 330 according to the present embodiment, it is possible to achieve the same advantageous effects as with the electric wire segments 33 according to the first embodiment.

While the above particular embodiment and modifications have been shown and described, it will be understood by those skilled in the art that various further modifications, changes, and improvements may be made without departing from the spirit of the invention.

For example, in the first embodiment, each of the electric wire segments 33 forming the stator coil has the substantially rectangular cross section. However, each of the electric wire segments 33 may also have, for example, a substantially square cross section or a substantially elliptical cross section.

Moreover, in the first embodiment, each corresponding pair of the stripped portions 33d of the electric wire segments 33 are jointed by TIG welding to form the joint 33f therebetween. However, each corresponding pair of the stripped portions 33d may also be jointed by other methods, for example crimping, to form the joint 33f therebetween.

In the second embodiment, each of the insulating coats of the electric wire segments 33 is configured to include the inner layer 33m and the outer layer 33k. However, each of the insulating coats of the electric wire segments 33 may also be configured to include 3 or more layers so that: the innermost layer abuts the electric conductor without peeling therefrom; and each of all the other layers includes a peeled portion that has a distal end peeled from the immediately inner layer to it and a proximal end remaining attached to the immediately inner layer.

In the previous embodiments, the present invention is applied to the stator 3 of the automotive alternator 1. However, it is also possible to apply the present invention to stators of other electric rotating machines, such as a stator of a motor-generator of a hybrid vehicle.

What is claimed is:

1. A stator for an electric rotating machine, the stator comprising:
   a stator core; and
   a stator coil mounted on the stator core, the stator coil being formed of a plurality of electric wire segments each of which is comprised of an electric conductor and an insulating coat that covers an outer surface of the electric conductor,
   wherein
   the electric wire segments forming the stator coil comprise a joined pair of first and second electric wire segments,
   each of the first and second electric wire segments has an end portion of a first predetermined length where the electric conductor is not covered by the insulating coat,
   the end portions of the first and second electric wire segments are joined together, and
   for each of the first and second electric wire segments, the insulating coat has, at its boundary with the end portion of the electric wire segment, a peeled portion of a second predetermined length which has a distal end peeled from the electric conductor and a proximal end remaining attached to the electric conductor, the proximal end being positioned further from the end portion of the electric wire segment than the distal end is.

2. The stator as set forth in claim 1, further comprising an insulator that covers the end portions of the first and second electric wire segments and the peeled portions of the insulating coats of the first and second electric wire segments.

3. The stator as set forth in claim 2, wherein for each of the first and second electric wire segments, a space between the peeled portion of the insulating coat and the electric conductor is filled with the insulator.

4. The stator as set forth in claim 2, wherein for each of the first and second electric wire segments, the peeled portion of the insulating coat extends obliquely with respect to the electric conductor so as to expand from the proximal end to the distal end thereof.

5. A stator for an electric rotating machine, the stator comprising:
- a stator core; and
- a stator coil mounted on the stator core, the stator coil being formed of a plurality of electric wire segments each of which is comprised of an electric conductor and an insulating coat that includes an inner layer and an outer layer, the inner layer covering an outer surface of the electric conductor, the outer layer covering an outer surface of the inner layer, wherein the electric wire segments forming the stator coil comprise a joined pair of first and second electric wire segments, each of the first and second electric wire segments has an end portion of a first predetermined length where the electric conductor is not covered by the insulating coat, the end portions of the first and second electric wire segments are joined together, and for each of the first and second electric wire segments, the inner layer of the insulating coat abuts the electric conductor and has an end at its boundary with the end portion of the electric wire segment, and the outer layer of the insulating coat has a peeled portion of a second predetermined length which has a distal end peeled from the end of the inner layer and a proximal end remaining attached to the inner layer.

6. The stator as set forth in claim 5, further comprising an insulator that covers the end portions of the first and second electric wire segments and the peeled portions of the outer layers of the insulating coats of the first and second electric wire segments.

7. The stator as set forth in claim 6, wherein for each of the first and second electric wire segments, a space between the peeled portion of the outer layer of the insulating coat and the inner layer of the insulating coat is filled with the insulator.

8. The stator as set forth in claim 6, wherein for each of the first and second electric wire segments, the peeled portion of the outer layer of the insulating coat extends obliquely with respect to the inner layer so as to expand from the proximal end to the distal end thereof.

* * * * *